Figure 3:
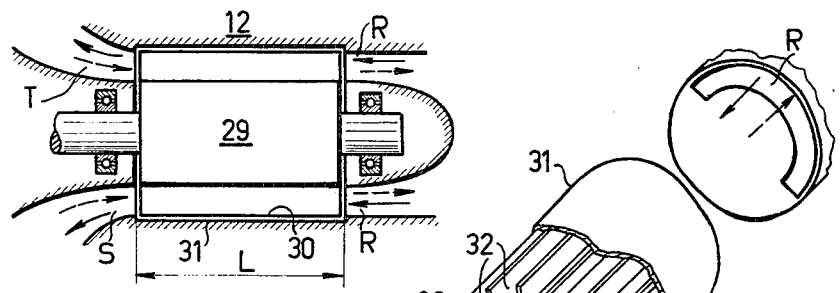

Nov. 23, 1965 M. BERCHTOLD ETAL 3,218,807
TRANSFER OF THE WORKING MEDIUM IN THE WORKING MEDIUM EXCHANGE
BETWEEN A CLOSED-CYCLE GAS TURBINE PLANT AND A RESERVOIR
Filed May 28, 1962 2 Sheets-Sheet 1
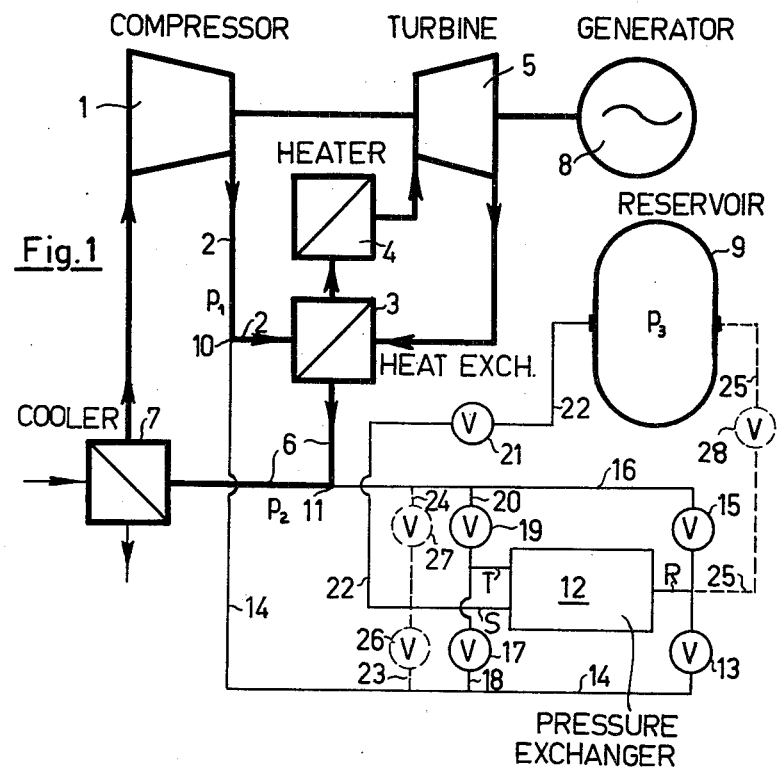
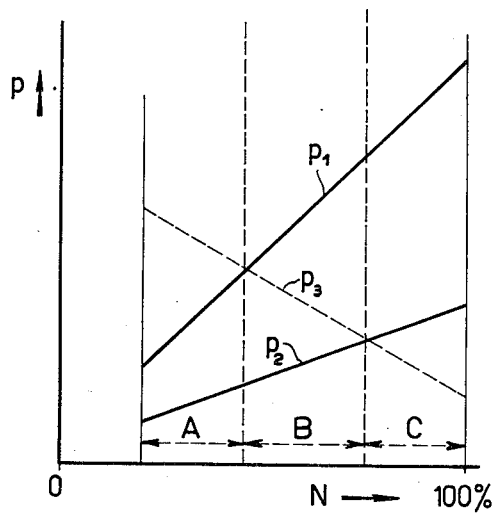
INVENTORS
MAX BERCHTOLD &
CURT KELLER
By Dodge and Sons
ATTORNEYS

United States Patent Office 3,218,807
Patented Nov. 23, 1965

3,218,807
TRANSFER OF THE WORKING MEDIUM IN THE WORKING MEDIUM EXCHANGE BETWEEN A CLOSED-CYCLE GAS TURBINE PLANT AND A RESERVOIR
Max Berchtold and Curt Keller, Zurich, Switzerland, assignors to Escher Wyss Aktiengesellschaft, Zurich, Switzerland, a corporation of Switzerland
Filed May 28, 1962, Ser. No. 198,288
Claims priority, application Switzerland, Aug. 9, 1961, 9,358
13 Claims. (Cl. 60—59)

An advantageous possibility of varying the power delivery in a closed-cycle gas turbine plant consists, in the known manner, in varying the pressure level in the working medium circuit by introducing working medium from the outside into the circuit for increasing the power delivery and by removing working medium from the circuit for decreasing the power delivery. The compression and expansion of the working medium in the circuit then occur at constant Mach numbers. Only the compression of the gases flowing through the turbo-machines and heat exchangers varies, and the power delivery of the plant is substantially proportional to the working medium density, provided the working medium is always heated to constant temperature before expansion by suitable adaptation of the heat supply. If air is used as working medium, this can be forced into the plant from the outside in a simple manner by means of reciprocating or rotary compressors. For reducing the power, the air is released into the surroundings.

If, on the contrary, in such a gas turbine plant helium is used for example as working medium, this being found to be particularly favourable in connection with gas-cooled atomic nuclear reactors, the helium is preferably not stored at the ambient pressure, since otherwise the necessary storage volume would be excessively large. The working medium withdrawn from the gas turbine plant for reducing the power is accommodated in a storage reservoir. For given maximum and minimum pressure in the reservoir, the volume of the reservoir is determined by the amount of gas to be withdrawn from the gas turbine plant. A substantial difficulty arises from the fact that in connection with gas-cooled atomic nuclear reactors, oil-lubricated machines may not be used for compressing the helium.

A process is known in which the reservoir is held at a pressure situated between the maximum and minimum pressure of the working circuit, so that without special transfer devices, in case of need for the purpose of reducing the power, working medium can always be released from the high-pressure part of the circuit into the reservoir, or for increasing the power of the plant, working medium can be released from the reservoir into the low-pressure part of the circuit. Since, however, with falling pressure in the circuit, the reservoir pressure increases and vice versa, a condition is soon reached in which the reservoir pressure reaches either the maximum pressure or minimum pressure of the circuit, and in one case no further release of working medium from the circuit to the reservoir is possible, while in the other case, no further admission of working medium from the reservoir to the circuit is possible. The regulation range is comparatively small, and this is particularly the case if the plant is operated with helium as working medium, when as a rule a smaller compression ratio is used than in the case of air-operated plants.

A process is also known in which, in the case of relief of load of a closed-cycle gas turbine plant, an auxiliary compressor transfers working medium from a high-pressure point of the working circuit to a reservoir of still higher pressure, and this auxiliary compressor is driven by an auxiliary turbine fed by a short-circuit flow between two points at different pressures of the working circuit. Since, however, in the case of gas exchange between circuit and reservoir on the one hand relatively small quantities are transferred in unit time, and on the other hand, relatively high compression ratios occur, the auxiliary turbo-machines are very small and operate with a poor efficiency. Adaptation to fluctuating working conditions is also difficult.

The invention obviates these disadvantages. It relates to a process for the transfer of the working medium in the working medium exchange between the working circuit of a closed-cycle gas turbine plant and a working medium reservoir for the purpose of varying the pressure level in the plant. According to the invention, in this process, working medium expanding from a high-pressure point of the circuit to a low-pressure point of the circuit, and the working medium exchanging between circuit and reservoir are passed through a pressure-exchanger in such a manner that pressure waves set up on the passage of the expanding working medium in the pressure-exchanger produce a compression and transfer of the working medium alternating between circuit and reservoir.

The invention furthermore concerns an arrangement for carrying out this process in a closed-cycle gas turbine plant, which has a reservoir for receiving the working medium to be withdrawn from the circuit in the case of pressure-level reduction. In this arrangement, according to the invention, a pressure-exchanger, intended for gas flow between three points of different pressure is provided between the working circuit of the plant and the working medium reservoir, and means are provided for permitting two points of different pressure of the circuit to be connected to opposite ends of the pressure-exchanger, and for permitting the working medium reservoir to be connected to one of the two ends of the pressure-exchanger.

The process according to the invention will be explained by way of example with reference to the accompanying drawing.

Figure 4:
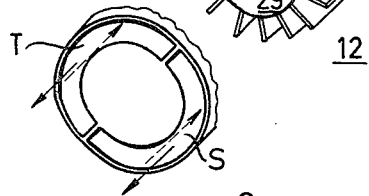

FIGURE 1 of the drawing shows in simplified manner a constructional example of an arrangement according to the invention. FIGURE 2 is a diagram of the pressure variation in the circuit and reservoir as a function of the useful power delivery of the plant. FIGURE 3 shows in a simplified form of representation a longitudinal section through the pressure-exchanger, and FIGURE 4 is a perspective view of the rotor of the pressure-exchanger and inlet and outlet channels.

Figure 5:
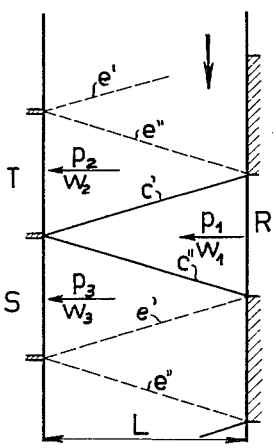
Figure 7:
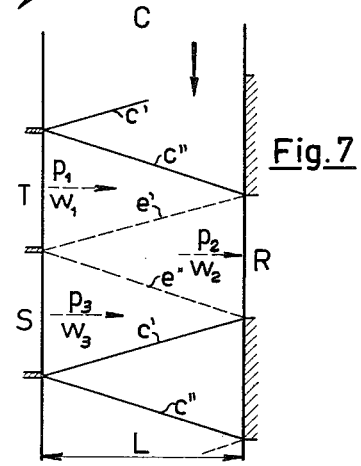
Figure 6:
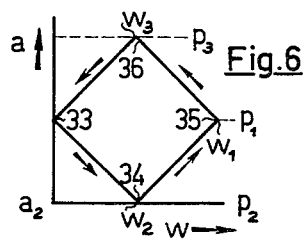
Figure 8:
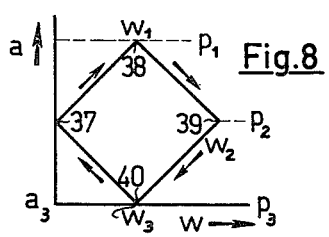

FIGURES 5 and 7 show the form of the wave fronts in the pressure-exchanger for two different working conditions, and FIGURES 6 and 8 show the connection between velocity of flow and pressure condition of the working medium in the course of one revolution of the rotor of the pressure-exchanger for the same working conditions.

The working medium of the closed-cycle gas turbine plant is raised in a compressor 1 from an initial pressure $p_2$ to a higher final pressure $p_1$, then passes through a pipeline 2 to a heat exchanger 3 and thereupon to a heater 4, which for example may consist of an atomic nuclear reactor. The working medium heated in the heat exchanger 3 and heater 4 is then expanded in a turbine 5. The working medium, thus expanded, flows through the heat exchanger 3, in which it gives off heat to the compressed working medium, and finally passes through a pipe line 6 to a cooler 7, whence it again flows to the compressor 1, thus closing the circuit. The turbine 5 drives the compressor 1 and in addition delivers useful power to an electric current generator 8.

To be able to produce a variation in the pressure level in the working circuit and hence a variation in the power delivery, a device is also provided which comprises a working medium reservoir 9, in which a pressure $p_3$ prevails. This reservoir 9 is connected by a system of closable pipelines to two points of different pressure of the circuit, namely to a point 10 of the pipeline 2, at which the compression pressure $p_1$ prevails, and to a point 11 of the pipeline 6 at which prevails a pressure corresponding substantially to the suction pressure $p_2$ of the compressor 1.

In the said pipeline system there is now connected between the working circuit of the plant and the working medium reservoir 9 a pressure-exchanger 12 intended for the flow of gas between three points of different pressure. The pressure-exchanger has a stator casing which has a group of three channels or ports R, S, T for the inlet and outlet of flow medium. The ports S and T are arranged in a transverse valve face at one end of the causing and the port R is arranged in a transverse valve face at the other end.

The port R can be connected on the one hand to the point 10 of the circuit by means of a pipeline 14, closable by a valve 13, and on the other hand to the point 11 of the circuit by means of a pipeline 16, closable by a valve 15. The port T of the pressure-exchanger can also be connected to the two points 10 and 11 of the circuit, namely to the points 10 by means of a pipeline 18, provided with a valve 17 and connected to the pipeline 14, and to the point 11 by means of a pipeline 20 provided with a valve 19 and connected to the pipeline 16. Furthermore, a pipeline 22, closable by a valve 21, permits the reservoir 9 to be connected to the port S of the pressure-exchanger. Also, by means of the pipelines 23, 24, 25, shown by broken lines, with valves 26, 27, and 28, the port S can be connected alternatively to the point 10 or the point 11 of the circuit and the port R to the reservoir 9.

FIGURE 2 represents the high pressure $p_1$ and the low pressure $p_2$ of the circuit as a function of the useful power on the assumption of power regulation by pressure-level variation. The lower the pressure in the circuit, the more working medium must be stored in the reservoir 9. The pressure $p_3$ in the reservoir, therefore, varies contrary to the pressures $p_1$ and $p_2$; the greater it is, the lower is the power. The difference between the maximum and minimum pressure occurring in the reservoir 9, for given range of regulation of the power, is greater the smaller is the volume of the reservoir 9.

As follows from FIGURE 2, the reservoir pressure $p_3$ is selected so that in the lowest power range A it is above the high pressure $p_1$ of the circuit, and in the highest power range C, it is below the low pressure $p_2$ of the circuit. In an intermediate range B, the reservoir pressure $p_3$ lies between the pressures $p_1$ and $p_2$.

In the intermediate range B, an increase in power in the plant can be obtained directly in known manner by releasing working medium from the reservoir with the pressure $p_3$ into the low-pressure part of the circuit with the pressure $p_2$. With the arrangement according to FIGURE 1, this can be done by opening the two valves 21 and 27, the other valves, however, remaining closed. Working medium then flows from the reservoir 9 via pipelines 22, 24, 16 into the pipeline 6 of the circuit. Conversely, however, in the range B also, a reduction in power can be produced by releasing working medium from the high-pressure part of the circuit with the pressure $p_1$ into the reservoir with the lower pressure $p_3$, which can be done by opening the valves 21 and 26, permitting flow of working medium from the pipeline 2 of the circuit through the pipelines 14, 23, 22 to the reservoir 9. Furthermore, by opening the said valves 21, 26 or 21, 27, it is possible to obtain an increase in power in the range A, in which the reservoir pressure is higher than that of the two circuit pressures $p_1$ and $p_2$, or a reduction in power in the range C, in which each of the two circuit pressures $p_1$ and $p_2$ is higher than the reservoir pressure $p_3$.

The pressure-exchanger 12, connected between the working medium reservoir 9 and the working circuit now serves above all to control those power variations, which cannot be initiated merely by opening connecting pipelines between reservoir and circuit, namely the power reduction by transfer of working medium to the reservoir from the circuit in range A, and power increase by transfer of working meduim from the reservoir to the circuit in range C. This pressure-exchanger 12 uses energy liberated by the expansion of working medium from the high-pressure part of the circuit to the low-pressure part of the circuit from pressure $p_1$ to pressure $p_2$, for bringing, in the range A, working medium of pressure $p_1$ of the high-pressure side of the circuit to the still higher reservoir pressure, or for bringing, in the range C working medium of the lower reservoir pressure to the pressure $p_2$ of the low-pressure side of the circuit.

FIGURES 3 to 8 will serve to explain the mode of operation of the pressure-exchanger 12. The rotor of the pressure-exchanger 12 consists substantially of a drum 29 with radially set longitudinal fins 30, whereby the annular space left free between drum 29 and casing 31 is divided into separate channels 32 extending in the axial direction. Channels 32 serve as transfer paths through which working medium is transferred between port R and ports S and T.

The ports R, S, T of the stationary casing each extend substantially over a semicircular arc, as shown in FIG. 4, in which the casing parts with the ports R, S, T are shown separated axially by a certain amount from the rotor for the sake of clarity. The ports R, S, T co-operate with the ends of the rotor channels 32. The ports S, T are located adjacent one end of the channels 32 of the rotor 29, 30, while the port R is located adjacent the opposite end of the channels (or transfer paths) 32. The ports S, T are circumferentially displaced with respect to one another by an angle of 180° and the port R is situated angularly between the ports S and T.

For obtaining a power reduction in the range A, the port R is put into communication with the pipeline 2 of the high-pressure part of the circuit via pipeline 14 by opening of the valve 13 of FIGURE 1, so that the pressure $p_1$ prevails in said port. The port T at the opposite end of the pressure-exchanger is, on the contrary, connected to the pipeline 6 of the low-pressure part of the circuit via pipelines 20 and 16 by opening of the valve 19, so that the pressure $p_2$ prevails in the port T. Furthermore, by opening of the valve 21, the port S is connected by pipeline 22 to the reservoir 9 and is brought to the pressure $p_3$. The other valves remain shut. In the range A, the pressure $p_3$ is the highest and $p_2$ the lowest of the three pressures $p_1, p_2, p_3$. FIGURE 5 shows the developed aspect of the ports R, S, T.

If the rotor is set in rotation in the direction of the arrow at a speed such that in the time during which a channel (transfer path) 32 of the rotor passes one of the ports R, S, T a sound wave travels forwards and backwards over the entire axial length L of the rotor 29, 30, a flow is set up, as represented in FIGURE 3 by the solid line arrows.

Wave fronts are produced in the channels 32, as illustrated by the lines $c'$, $c''$ and $e'$, $e''$. The lines $c'$, $c''$ are compression waves and the lines $e'$, $e''$ are expansion waves.

In the diagram of FIGURE 6, the flow velocity $w$ is plotted as abscissae and the particular sound velocity $a$ as ordinates for the gas condition concerned. For the sake of simplicity, this sound velocity has been plotted instead of the pressure, which bears a certain relationship to it.

The point 33 corresponds to the condition between the two expansion waves $e'$, $e''$ of FIGURE 5. The gas is here at rest. On passing to the region connected to the port T, it expands along the expansion wave $e''$ to the pressure $p_2$ corresponding to point 34 in FIGURE 6, being given a velocity $w_2$ in a direction toward the port T.

From one edge of the opposite port R, a compression wave $c'$ starts and brings the gas to the pressure $p_1$ corresponding to point 35 in FIGURE 6, and at the same time increases its velocity in a direction towards the port T to the amount $w_1$.

The next compression wave $c''$ is obtained on passage to the port S, the pressure increasing to the still higher reservoir pressure $p_3$, and the velocity falling to the amount $w_3$ (point 36 in FIG. 6). The cycle is repeated afterwards.

In this process, therefore, the working medium in the pressure-exchanger 12 expands from the point 10 of high pressure of the circuit toward the point 11 of the circuit having a lower pressure via the ports R, T of the pressure-exchanger. On the other hand, working medium passes through the ports R and S of the pressure-exchanger from the point of high pressure 10 to the reservoir 9, having a still higher pressure. These two working medium streams are passed through the pressure-exchanger 12 in such a manner that the pressure waves $c'$, $c''$ formed on the passage of the expanded working medium produce a compression and transfer of the working medium changing from the circuit to the reservoir via the ports R, S.

If, on the other hand, in the range C, a power increase of the plant is to be obtained, the valves 15, 17 and 21 are opened, while the other valves remain closed. In this way, the high-pressure point 10 of the circuit is connected by the pipelines 14 and 18 to the port T of the pressure-exchanger 12, and communication is established by the pipeline 16 between the port R of the pressure-exchanger 12 and the point 11 situated on the low-pressure side of the circuit. As before, the reservoir remains connected by the pipeline 22 to the port S of the pressure-exchanger 12.

For the same direction of rotation of the rotor 29, 30 of the pressure-exchanger 12, a flow is set up in this case as indicated by the broken-lines in FIGURES 3, 4 and 7. According to FIGURE 7, compression waves $c'$, $c''$ and expansion waves $e'$, $e''$ are again produced in the channels 32. FIGURE 8 shows the variation in the condition of the gas as a function of the velocity.

In the region between $c'$ and $c''$ of FIGURE 7, the gas is at rest. In FIGURE 8, this corresponds to point 37. When communication is established with port T, the pressure increases to $p_1$, the gas being given a velocity $w_1$ toward the side of the port R (point 38 of FIGURE 8). In port R, the lower circuit pressure $p_2$ prevails. An expansion wave $e'$ is formed, the velocity $w_1$ being increased to $w_2$ (point 39 of FIGURE 8). A further expansion wave $e''$ follows between the port R and the port S, in which the still lower pressure $p_3$ prevails. In this case, the velocity of the gas returns to $w_3$ (point 40 of FIG. 8). In the region between $c'$ and $c''$, the original condition is again reached and the cycle is repeated.

In this process, working medium in the pressure-exchanger 12 again expands from the point 10 of high pressure of the circuit toward the point 11 of the circuit having a lower pressure. In comparison with the process according to FIGURE 5, the flow here takes place in the reverse direction through the pressure-exchanger 12, namely from port T to port R. At the same time, working medium flows from the reservoir 9, which has now a lower pressure than the circuit, to the point 10 of low pressure of the circuit. This flow according to FIGURE 7 is also directed opposite to the flow according to FIGURE 5. According to FIGURE 7, the two working medium streams are passed through the pressure-exchanger 12 in such a manner that the pressure waves $c'$, $c''$, set up on the passage of the expanding working medium, produce a compression and transfer of the working medium changing from the reservoir 1 to the circuit via the ports S, R.

In the present constructional example, it has been assumed that the ratio of the maximum pressure $p_1$ to minimum pressure $p_2$ in the working circuit is about 2.5. A compression ratio of about 2.5 can then also be obtained as a maximum for the working medium to be transferred. The pressure variation $p_3$ for the reservoir has therefore been assumed so that the maximum value of $p_3$ corresponds approximately to about 2.5 times the minimum value of $p_1$, and the maximum value of $p_2$ corresponds to about 2.5 times the minimum value of $p_3$. The diagram of FIGURES 6 and 8 correspond to these conditions. The velocity jumps for all the wave fronts are therefore the same, and the diagrams appear as squares.

Without alteration of the valve position, however, the entire region A or the entire region C can always be covered, the compression ratio for the working medium to be transferred diminishing on approaching the region B. The pressure-exchanger adapts itself automatically to variations in the working condition, and the squares of FIGURES 6 and 8 become rectangles. By means of the arrangement described, therefore, at all working conditions, an increase or decrease in the power of the plant can be obtained in a simple manner also even if the reservoir pressure is higher than the maximum circuit pressure or lower than the minimum circuit pressure.

Rotation of the rotor 29, 30 of the pressure-exchanger 12 does not serve to transmit power to the flowing working medium, but merely to bring the channels 32 in correct timing in communication with the stationary ports R, S, T. The drive of the rotor 29, 30 has therefore only to overcome mechanical friction losses, but must maintain the speed so that the compression waves or expansion waves pass from one end to the other of the rotor in the axial direction in the time in which a channel of the rotor passes over half one of the ports R, S, T. It may be driven, for example, by means of a turbine or electric motor.

Due to the fact that in the arrangement described, the pipelines 23, 24, 25 are additionally supplied with valves 26, 27, 28, the points 10, 11 of different pressure of the circuit can also be connected to the ports S, T at one end, and the reservoir 9 to the port R at the other end of the pressure-exchanger 12. By this means, it is possible to employ the pressure-exchanger 12 usefully also in the range B of FIGURE 2, that is to say, when the reservoir pressure lies between $p_1$ and $p_2$. Depending on whether the port T is connected by the valve 17 to the high-pressure point 10 of the circuit and the port S by the valve 27 to the low-pressure point 11 of the circuit, or whether the port T is connected by the valve 19 to the point 11 and the port S by the valve 26 to the point 10 of the circuit, there will be a transfer of working medium from the circuit to the reservoir or a transfer of working medium from the reservoir to the circuit. In the first case, working medium passes to the reservoir 9 not only from the high-pressure part of the circuit, but also from the low-pressure part, and this working medium is compressed in the pressure-exchanger 12 to the reservoir pressure by utilisation of the energy liberated on the transfer of working medium from the high-pressure part of the circuit to the reservoir. In the second case, not only does working medium pass from the reservoir to the low-pressure part of the circuit, but at the same time working medium from the reservoir is compressed and transferred to the high-pressure part of the gas turbine plant. The compressor 1 of the gas turbine circuit is thus relieved of load.

If in the pressure-exchanger, a drive with variable direction of rotation is provided for the rotor, a reversal of the direction of transfer can also be obtained by reversing the direction of rotation of the rotor, instead of interchanging the connection points of the ports S and T.

A reversal of the transfer direction would also be possible in the ranges A and C of FIGURE 2 by interchanging the connections of the ports S and T in FIGURE 5 or 7 or by reversal of the direction of rotation of the rotor of the pressure-exchanger. The energy of the working medium passing from the reservoir to the circuit in the range A or from the circuit to the reservoir in the range C would then be used for additionally compressing the working medium circulating in circuit parallel to the circuit compressor 1, whereby an increased useful power would be obtained.

For the connection of the pressure-exchanger 12 to the working circuit, it would be possible if required to use instead of points 10 and 11 of maximum and minimum pressure, also other points of different pressures, for example points situated at intermediate stages of the compressor 1 or of the turbine 5, in which case, however, there would be less energy available for compression of the working medium alternating between reservoir and circuit.

What is claimed is:

1. The method of controlling the power output of a closed circuit gas turbine power plant by varying the weight of gaseous working medium therein by the transfer of said medium between a storage reservoir, outside the circuit and in which the pressure may be higher than the maximum pressure in the circuit or less than the minimum pressure in the circuit, and either of two points within the circuit, said points being at different pressures, which method consists in establishing a transfer cycle through a flow path, the medium at highest pressure being connected with said path at one end thereof throughout substantially all of an interval equal to one half of said cycle, the medium at lowest pressure being connected with said path at said one end through substantially all of an interval occurring during and equal to the other half of said cycle, and the medium at intermediate pressure being connected with the other end of said flow path throughout an interval substantially equal to one half of said cycle, said last mentioned interval being 90° out of phase with said other intervals, said other end of the flow path being closed except when so connected, the length of said flow path being equal to the distance travelled by a sound wave during one quarter of said cycle.

2. In a closed circuit gas turbine power plant of the type in which the power output of the plant may be controlled by a transfer of working medium between a storage reservoir outside the circuit and either of two points, at different pressure, in the circuit and in which the plant is operable in a first range of low output, a second range of intermediate output and a third range of high output and in which the reservoir pressure in said first range is higher than the pressure at any point within the circuit and in which in the second range the reservoir pressure lies between the highest pressure occurring within the circuit and the lowest pressure occurring within the circuit and in which in the third range the reservoir pressure is lower than the pressure occurring anywhere within the circuit, the method of reducing the output of the plant in the first range which consists in establishing a transfer cycle through a flow path outside the circuit; connecting one end of the path to the one of the points which is at the lower pressure throughout a first interval substantially equal to half the cycle, connecting the other end of the path with the other of the points throughout a second interval substantially equal to half the cycle, commencement of the first time interval leading commencement of the second by a phase angle of 90°; connecting said one end of the path to the reservoir through a third interval substantially equal to half the cycle, commencement of the third interval being 180° out of phase with commencement of the first; closing said other end of the path when it is not connected to said other point, the length of the path being equal to the distance travelled by a sound wave during one quarter of the cycle.

3. In a closed circuit gas turbine power plant of the type in which the power output of the plant may be controlled by a transfer of working medium between a storage reservoir outside the circuit and either of two points, at different pressure, in the circuit and in which the plant is operable in a first range of low output, a second range of intermediate output and a third range of high output and in which the reservoir pressure in said first range is higher than the pressure at any point within the circuit and in which in the second range the reservoir pressure lies between the highest pressure occurring within the circuit and the lowest pressure occurring within the circuit and in which in the third range the reservoir pressure is lower than the pressure occurring anywhere within the circuit, the method of increasing the output of the plant in the third range which consists in establishing a transfer cycle through a flow path outside the circuit; connecting one end of the path to the one of the points which is at the higher pressure throughout a first interval substantially equal to half the cycle; connecting the other end of the path to the other point throughout a second time interval substantially equal to half the cycle, the commencement of the first interval leading commencement of the second by a phase angle of 90°; connecting said one end of the path with the reservoir through a third interval substantially equal to one half the cycle, commencement of the third interval being 180° out of phase with commencement of the first, closing said other end of the path when it is not connected to said other point, the length of the path being equal to the distance travelled by a sound wave during one quarter of the cycle.

4. In a closed circuit gas turbine power plant of the type in which the power output of the plant may be controlled by a transfer of working medium between a storage reservoir outside the circuit and either of two points, at different pressure, in the circuit and in which the plant is operable in a first range of low output, a second range of intermediate output and a third range of high output and in which the reservoir pressure in said first range is higher than the pressure at any point within the circuit and in which in the second range the reservoir pressure lies between the highest pressure occurring within the circuit and the lowest pressure occurring within the circuit and in which in the third range the reservoir pressure is lower than the pressure occurring anywhere within the circuit, the method of reducing the output of the plant in the third range which consists in establishing a transfer cycle through a flow path outside the circuit; connecting one end of the flow path to the reservoir throughout a first interval substantially equal to half the cycle; connecting the other end of the path to the one of the points which is at the lower pressure throughout a second interval substantially equal to half the cycle, commencement of the first interval leading commencement of the second by a phase angle of 90°; connecting said one end of the flow path with the other of said points throughout a third interval substantially equal to half the cycle, commencement of the third interval being 180° out of phase with commencement of the first, closing said other end of the flow path when it is not connected to said one of the points, the length of the path being equal to the distance travelled by a sound wave during one quarter of the cycle.

5. In a closed circuit gas turbine power plant of the type in which the power output of the plant may be controlled by a transfer of working medium between a storage reservoir outside the circuit and either of two points, at different pressure, in the circuit and in which the plant is operable in a first range of low output, a second range of intermediate output and a third range of high output and in which the reservoir pressure in said first range is higher than the pressure at any point within the circuit and in which in the second range the reservoir pressure lies between the highest pressure occurring within the circuit and the lowest pressure occurring within the circuit and in which in the third range the reservoir pressure is lower than the pressure occurring anywhere within the circuit, the method of increasing the output of the plant in the first range which consists in establishing a transfer cycle through a flow path outside said circuit; connecting one end of the path to the reservoir throughout a first interval substantially equal to half the cycle; connecting the other end of the path to the one of the points which is at the higher pressure throughout a second interval substantially equal to half the cycle, commencement of the first interval leading commencement of the second by a phase angle of 90°; connecting said one end of the path to the other of said points throughout a third interval substantially equal to half the cycle, commencement of the third interval being 180° out of phase with commencement of the first, closing said other end of the path when it is not connected to said one of the points, the length of the path being equal to the distance travelled by a sound wave during one quarter of the cycle.

6. In a closed circuit gas turbine power plant of the type in which the power output of the plant may be controlled by a transfer of working medium between a storage reservoir outside the circuit and either of two points, at different pressure, in the circuit and in which the plant is operable in a first range of low output, a second range of intermediate output and a third range of high output and in which the reservoir pressure in said first range is higher than the pressure at any point within the circuit and in which in the second range the reservoir pressure lies between the highest pressure occurring within the circuit and the lowest pressure occurring within the circuit and in which in the third range the reservoir pressure is lower than the pressure occurring anywhere within the circuit, the method of reducing the output of the plant in the second range which consists in establishing a transfer cycle through a flow path outside said circuit; connecting one end of the path with the one of said points which is at the higher pressure throughout a first interval substantially equal to half the cycle; connecting the other end of the path with the reservoir throughout a second interval substantially equal to half the cycle, commencement of the first interval leading the commencement of the second by a phase angle of 90°; connecting said one end of the path with the other point throughout a third interval substantially equal to half the cycle, commencement of the third interval being 180° out of phase with commencement of the first, closing said other end of the path when it is not connected to the reservoir, the length of the flow path being equal to the distance travelled by a sound wave during one quarter of the cycle.

7. In a closed circuit gas turbine power plant of the type in which the power output of the plant may be controlled by a transfer of working medium between a storage reservoir outside the circuit and either of two points, at different pressure, in the circuit and in which the plant is operable in a first range of low output, a second range of intermediate output and a third range of high output and in which the reservoir pressure in said first range is higher than the pressure at any point within the circuit and in which in the second range the reservoir pressure lies between the highest pressure occurring within the circuit and the lowest pressure occurring within the circuit and in which in the third range the reservoir pressure is lower than the pressure occurring anywhere within the circuit, the method of increasing the output of the plant in the second range which consists in establishing a transfer cycle through a flow path outside said circuit; connecting one end of the path to the one of said points which is at the lower pressure through a first interval substantially equal to half the cycle; connecting the other end of the path to the reservoir through a second interval substantially equal to half the cycle, commencement of the first interval leading commencement of the second by a phase angle of 90°; connecting said one end of the path to the other point through a third interval substantially equal to half the cycle, commencement of the third interval being 180° out of phase with the commencement of the first; closing said other end of the path when it is not connected to said reservoir, the length of the flow path being equal to the distance travelled by a sound wave during one quarter of the cycle.

8. In combination with a closed-cycle gas turbine power plant of the type operating with a closed circuit of a gaseous working medium and including compressing means, a high pressure flow path for the compressed working medium including heating means, turbine means, and a low pressure flow path for the expanded working medium including cooling means, and the power output of which may be controlled by transferring working medium between a storage reservoir and the closed circuit; the improvement characterized by improved means to control the power output of the plant which means comprises (a) a transfer path outside circuit
(b) first and second valving means at one end of the transfer path
(c) third valve means at the other end of the transfer path
(d) means to open and close the first and second valve means seriatim and cyclically, the open interval of each valve means being substantially equal to half the cycle and 180° out of phase with the other open interval;
(e) means to open and close the third valve means cyclically, the open interval of the third valve means being substantially equal to half the cycle and 90° out of phase with the open intervals of the first and second valve means;
(f) means operable to connect each of the valve means selectively to one of three locations, namely, said reservoir, said high pressure flow path or said low pressure flow path,
(g) the connections being selected so that the third valve means is always connected with that location at which the pressure is intermediate the pressures at the other locations, and
(h) the length of the transfer path being equal to the distance travelled by a sound wave during one quarter of the cycle.

9. In combination a closed-cycle gas turbine power plant, operating with a closed circuit of a gaseous working medium comprising compressing means, a flow path for the compressed working medium including heating means, turbine means, and a flow path for the expanded working medium including cooling means; a storage reservoir for working medium; and a pressure-exchanger comprising a rotor carrying a plurality of channels extending therethrough; a stator casing having a group of three ports for the inlet and outlet of flow medium arranged so as to co-operate with the ends of said channels; two of said ports being located adjacent one end of said channels angularly displaced with respect to one another and the third port adjacent the other end of said channels angularly between said two ports; and flow connections including shut-off means between the circuit of the gas turbine plant, the reservoir and said three ports allowing to connect two points of the circuit having different pressure with one of said first named two ports and the said third port, respectively, and to connect the reservoir with the other of said first named two ports.

10. The combination defined in claim 9, in which the flow connections connecting the points having different pressure of the circuit with one of the first named two ports and the third port, respectively, are interchangeable in such a manner that either the point having higher pressure or the point having lower pressure of the circuit can be connected to said third port.

11. The combination defined in claim 9 in which means are also provided for allowing a point of the circuit of the gas turbine plant to be connected to the reservoir while by-passing the pressure exchanger.

12. The combination defined in claim 9 further comprising means for allowing the said two points of different pressure of the circuit to be connected to the said first named two ports of the pressure-exchanger, respectively, and the reservoir to be connected to the said third port of the pressure-exchanger.

13. The combination defined in claim 9 in which the pressure-exchanger has a reversible drive.

References Cited by the Examiner

UNITED STATES PATENTS 2,446,108  7/1948  Salzmann _____ 60—59

FOREIGN PATENTS 862,385  3/1961  Great Britain.

OTHER REFERENCES

Article, "Nuclear-Chemical Hybrids" (Nesterenko et al.), Space/Aeronautics Engineering, April 1959 (pp. 47–49).

EDGAR W. GEOGHEGAN, *Primary Examiner.*

JULIUS E. WEST, *Examiner.*